Aug. 24, 1965  C. W. WEST  3,202,181
SINGLE LEVER MIXING FAUCET

Filed June 24, 1963  2 Sheets-Sheet 1

INVENTOR.
CLARENCE W. WEST
BY
ATTYS.

Aug. 24, 1965    C. W. WEST    3,202,181
SINGLE LEVER MIXING FAUCET

Filed June 24, 1963    2 Sheets-Sheet 2

INVENTOR.
CLARENCE W. WEST
BY
Leist, Lockwood, Trumawalt
& Dewey
ATTYS.

# United States Patent Office 3,202,181
Patented Aug. 24, 1965

3,202,181
SINGLE LEVER MIXING FAUCET
Clarence W. West, Oak Park, Ill., assignor to Vance Industries, Inc., Chicago, Ill., a corporation of Delaware
Filed June 24, 1963, Ser. No. 289,921
16 Claims. (Cl. 137—625.17)

This invention relates to single lever mixing faucets for controlling both the rate and temperature of water dispensed therefrom, and more particularly to new and useful improvements in the construction of such a faucet.

It is a primary object of this invention to provide in a single lever mixing faucet for controlling both the rate and temperature of water dispensed therefrom, a generally cylindrical body member having axially extending hot and cold water inlet bores in one end thereof, thereby providing a faucet of compact design which readily lends itself to attractive installation.

It is a further object of this invention to provide in a faucet of the type mentioned above, simplified construction including a generally cylindrical body member having an axially extending central bore and a plurality of axially extending side bores in one end of the body, which side bores open laterally along substantially the entire length thereof into the central bore, wherein certain of the side bores adapt the body for receiving hot and cold water and wherein another of the side bores adapts the body for communication with a spray outlet.

It is a further object of this invention to provide in a single lever mixing faucet including a body member having an axially extending central bore adapted to receive a hollow closed end cylinder mounted for both reciprocation and rotation therein, which cylinder is provided with water outlet means adjacent one end thereof, improved annular sealing means in the central bore for sealing and closing the water outlet means when the cylinder is moved axially to the closed position thereof.

An even further object of the present invention is the provision of a single lever mixing faucet of the type mentioned above which includes improved sealing means for preventing leakage in the faucet.

It is a still further object of this invention to provide a single lever mixing faucet for controlling both the rate and temperature of water dispensed therefrom, which faucet is balanced in both the closed and open positions thereof and which faucet will fulfill all of the objects set forth above.

These and other objects and advantages of the invention will become apparent from the following specification wherein like numerals refer to similar parts throughout.

Figure 3:
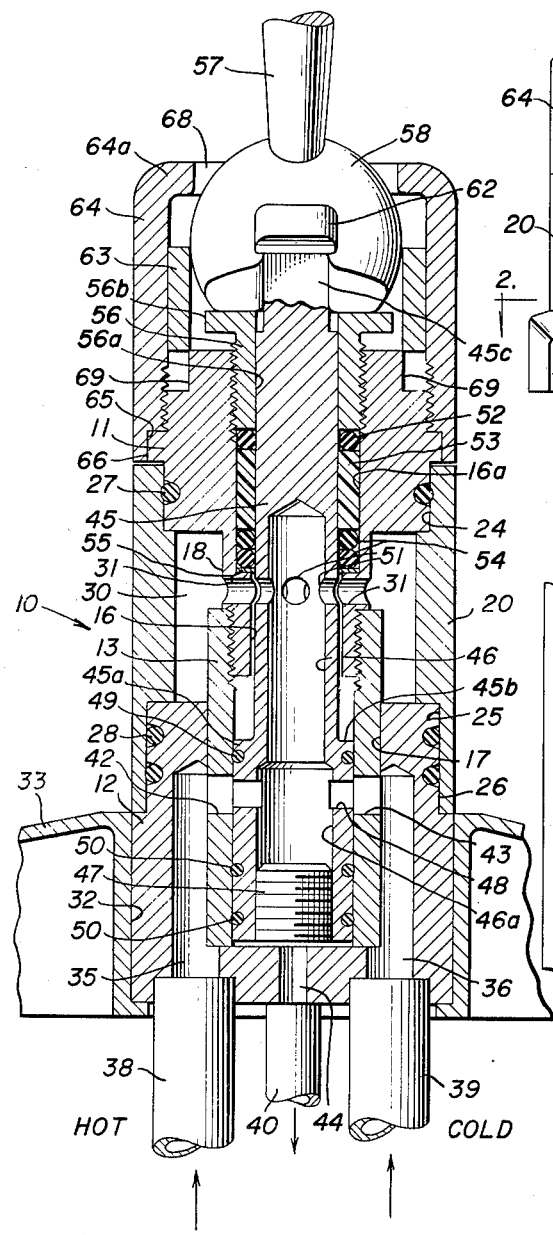
FIG. 3 is a section taken along the line 3—3 of FIG. 2 showing the mixing faucet in its full open position and receiving equal amounts of hot and cold water.
Figure 1:
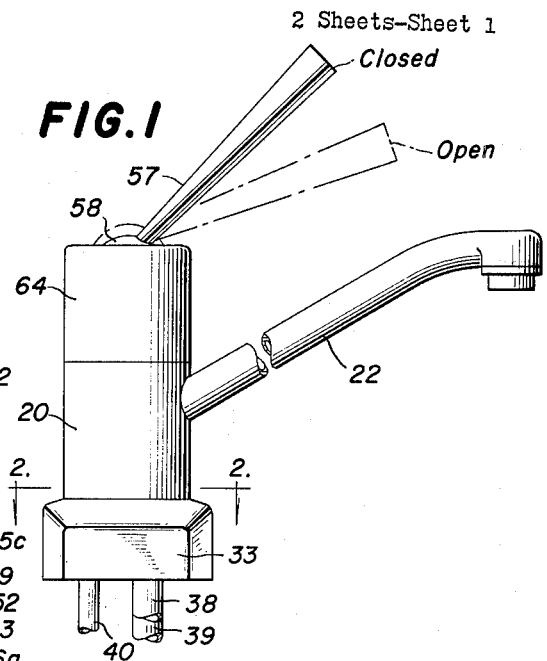
FIG. 1 is a side elevation of one embodiment of the single lever mixing faucet of this invention.

Referring to the drawings, the single lever mixing faucet will be seen to include a generally cylindrical body, generally designated 10, which body primarily includes an upper member 11 and a solid base member 12 having a liner 13. The body 10 is provided with an axially extending central bore 14 defined by an axially extending central bore 16 in the upper member 11 and by an axially extending central bore 17 in the base member 12, which bore 17 is co-axial with the bore 16 and adapted to receive the liner 13 tightly therein. The upper member 11 includes a depending, axially extending, central, sleeve-like portion 18 externally threaded at the lower end thereof for threading engagement with interior threads provided in the liner 13 at the upper end thereof. A sleeve 20 having an opening 21 in the wall thereof is mounted between the upper member 11 and the base member 12 for rotation about the longitudinal axis of the body 10. The sleeve has a spout 22 of conventional design attached thereto surrounding the opening 21. The sleeve 20 is provided at the upper end thereof with an internal annular recess 24 adapted for telescoping engagement with the outside of the upper member 11 and a second internal annular recess 25 in the lower end thereof adapted for telescoping engagement with a reduced diameter portion 26 of the base member 12. It will be understood that there is a slight clearance between the recesses of the sleeve 20 and the members 11 and 12 for permitting easy rotation of the sleeve. The sleeve 20 is sealingly engaged with the upper member 11 by an O-ring 27, which O-ring is adapted to be received in an annular recess in the upper member. In like manner, the sleeve 20 is sealingly engaged with the base member 12 by a pair of O-rings 28, each of which O-rings is adapted to be received in an annular recess formed in the reduced diameter portion 26 of the base member. It will be understood that the sleeve 20, which defines an annular cavity 30 between the inside thereof and the outside of the liner 13 and sleeve-like portion 18, is rotatable on the body member to permit the spout 22 to be swung freely by the hand of a person. The sleeve-like portion 18 of the upper member 11 is provided with a plurality of radially disposed outlet passageways 31, which passageways communicate the annular cavity 30 with the bore 16.

The faucet body 10 is preferably supported in a recess 32 formed in a horizontally disposed elongated housing member 33. If the faucet of this invention is to be used in association with a sink, such as a kitchen sink, the housing 33 serves as a means for attractively mounting the faucet thereon. It will be realized that many different forms of housings or mounting members may be used with the mixing faucet of this invention depending on the type of fixture with which the faucet is associated.

Figure 5:
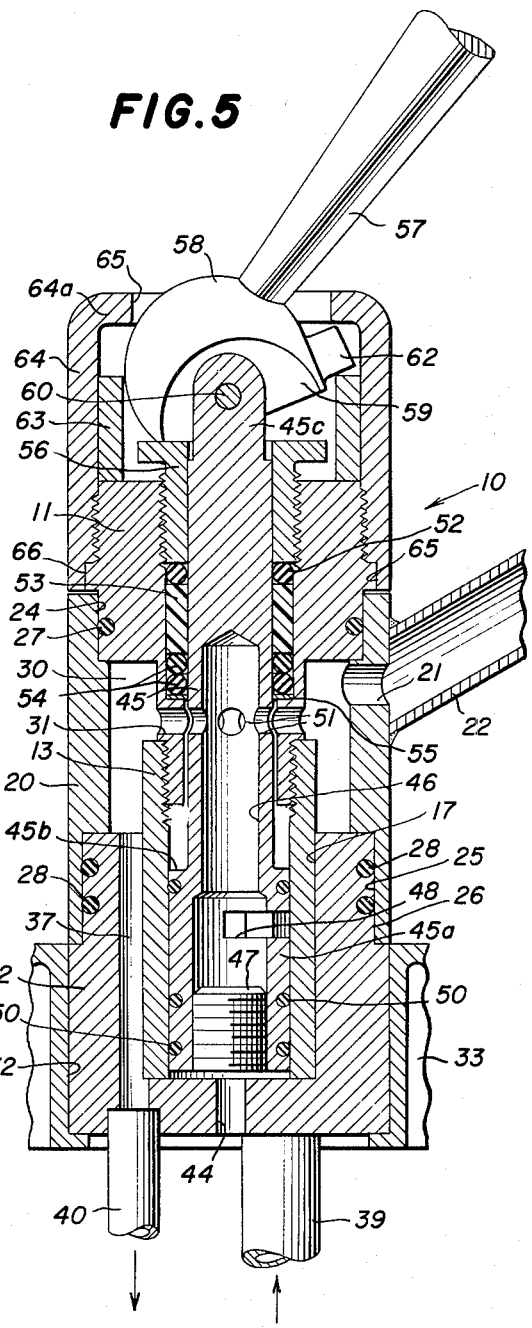
FIG. 5 is a section taken along the line 5—5 of FIG. 2 showing the faucet in its full open position and receiving equal amounts of hot and cold water.

The base member 12, which is of unique construction, is provided with three, equally spaced, axially extending, side bores, 35, 36 and 37, which bores open laterally along substantially the entire lengths thereof into the central bore 17 in the base member. The side bores 35 and 36 are blind bores, i.e., they terminate in the base member 11, while the side bore 37 extends completely through the base member, as best seen in FIG. 5, opening axially into the annular cavity 30. As will be referred to hereinafter, the annular cavity is adapted to receive a ring-like spout diverter (not shown) for diverting water in the annular cavity downwardly through the side bore 37. Suitable tubular conduits 38 and 39 secured to the base member by any suitable means are adapted for communication with the side bores 35 and 36, respectively. A tubular conduit 40 also suitably secured in the base member 11 is adapted for communication with the side bore 37. For purposes of illustration, it may be assumed that the tubular conduit 38 is in communication with a source of hot water while the tubular conduit 39 is in communication with a source of cold water. The tubular conduit 40 extends to a dish spray hose of the type used on kitchen sinks. The liner 13 tightly received in the central bore 17 of the base member 11 separates the side bores 35, 36 and 37 from the central bore 7. The liner 13 is provided with a pair of radially disposed inlet ports 42 and 43 intermediate the length thereof, which ports 42 and 43 are adapted for registration with the side bores 35 and 36, respectively, near the inner ends of the latter, thereby placing the side bores in communication of the interior of the liner 13. An axially extending central bore 44 of relatively small diameter communicates bore 14 with the exterior of the base member 12. It should be apparent that the base member 12 lends itself to easy and inexpensive manufacture. The base member is formed by first drilling the side bores therein followed by drilling of bore 17. Next, the liner 13 having the ports 42, 43 therein is inserted in the bore 17, thereby separating the side bores from the central bore and providing separate inlets for admitting hot and cold water to the interior of the liner.

A cylinder 45 having an enlarged portion 45a at the lower end thereof is mounted for reciprocation and for rotation in the axially extending central bore 14 of the body member. Bore 16 is dimensioned to provide a thin annular space between this bore and the cylinder. Enlarged portion 45a has a diameter only a few thousandths of an inch less than the diameter of the inside of the liner 13 to permit free movement of the cylinder. The enlarged portion 45a of the cylinder 45 defines an annular shoulder 45b, which shoulder is adapted to abut the sleeve-like portion 18 of the upper member 11 for limiting upward axial movement of the cylinder in the body member. The cylinder 45 is provided with an axially extending blind bore 46 in the lower end thereof, which bore has an enlarged portion 46a adjacent the lower end of the cylinder. A plug 47 threadingly engageable with interior threads provided in the enlarged bore 46a is provided for closing the bore 46 at the lower end thereof. Thus, by the provision of the blind bore 46 and the plug 47 the cylinder 45 is essentially a hollow closed end cylinder mounted for both reciprocation and rotation in the axially extending central bore 14 of the body member. Bore 44 opening to atmosphere permits free movement of the cylinder in body 10.

Figure 2:
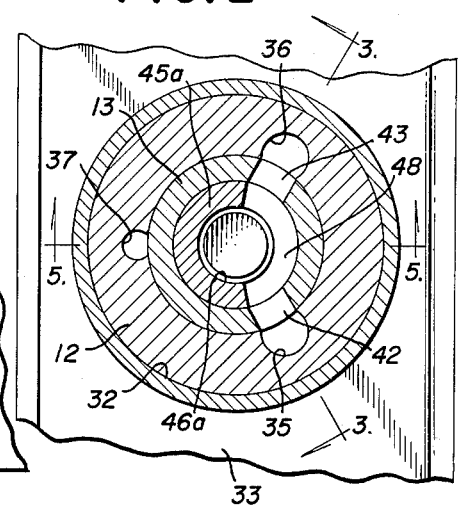
FIG. 2 is a section taken along the line 2—2 of FIG. 1.

The cylinder 45 is provided near the lower end thereof with hot and cold water inlet means in the form of a transversely disposed, generally semi-circular shaped, slot 48, which slot is adapted for full registration with the ports 42 and 43 when the cylinder is in its lowermost position in the central bore 14 and when the cylinder is rotated in the bore to a neutral position as best illustrated in FIG. 2. It will be apparent that by rotation of the cylinder 45 the respective amounts of registration of the bores 42 and 43 with the slot 48 will be varied depending on the direction of rotation of the cylinder. Incoming hot and cold water from the ports 42 and 43, respectively, is prevented from escaping in the small annular space between the cylinder portion 45a and the inside of the liner 13 by an O-ring 49 mounted in an annular recess above the slot 48 and by a pair of O-rings 50 mounted in annular recesses below the slot.

The cylinder 45 is provided near the upper end of the blind bore therein with water outlet means in the form of a plurality of radially disposed outlet openings 51 for discharging water through outlet passageways 31. Openings 51 need not be in registry with passageways 31 to permit flow into annular cavity 30 as water passing from openings 51 fills the thin annular space between the cylinder and bore 16 and then flows outwardly through passageways 31.

Figure 4:
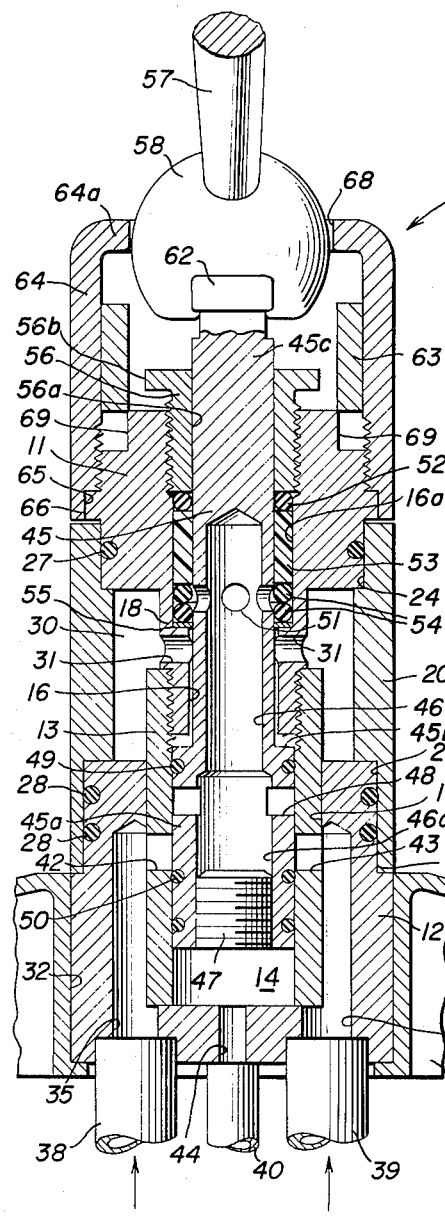
FIG. 4 is a section similar to FIG. 3 but showing the faucet in its partially closed position.

Upper member 11 is provided with an axially extending, central, enlarged bore 16a for receiving in serial relation from top to bottom, an O-ring 52, a packing ring 53, and a pair of O-rings 54. A washer 55, preferably of metal, is provided on the annular shoulder defined by bore 16a, which washer fits closely with cylinder 45 to prevent entry of O-rings 54 into the thin annular space between bore 16 and the cylinder. The O-rings prevent leakage of water between cylinder 45 and upper body member 11. Packing ring 53 snugly grips the outside surface of the cylinder for frictionally holding the latter in its desired angular or axial position in the body of the faucet. Of course this frictional fit is not so great as to hamper free positioning of the cylinder. When cylinder 45 is moved upwardly to its fully closed position, openings 51 are disposed above O-rings 54 thereby preventing escape of water through outlet passageways 31. In FIG. 4, the cylinder is illustrated in its partially closed position, i.e., when openings 51 are disposed within O-rings 54.

Bore 16a is threaded at the upper end thereof for threading engagement with external threads provided on a hollow plug member 56 which plug member secures the O-rings and packing ring in bore 16a. The plug member 56 which has an axially extending bore 56a slightly larger in diameter than the diameter of the cylinder, includes an outwardly extending annular flange 56b.

Rotation and reciprocation is imparted to the cylinder 45 by generally elongated handle 57, which handle has a spherical head member 58 secured to the inner end thereof. The head member includes a diametrically extending arcuate recess 59, which recess is adapted to receive freely an integral extension 45c of the cylinder 45. The head member 58 is pivotally secured to the upper end of the cylinder 45 for swinging movement in a vertical plane by the provision of a through bore in the head member, which bore is transversely disposed to the recess and adapted for co-axial alignment with an opening provided in the cylinder extension 45c; a screw 60 is provided for securing the handle to the cylinder, and the screw is held in place by the provision of a number of threads in one end of the head member through bore. The spherical head 58 includes an integral lug 62 extending therefrom beneath the handle member 57, which lug 62 is adapted to abut the upper surface of a ring 63. The ring 63 is adapted to rest on the top of the upper member 11, and the ring is held in place on the upper member by a generally cylindrical cap 64, which cap is provided with a number of interior threads near the lower end thereof for threading engagement with external threads provided on the body member 11. The lowermost portion of the cap 64 is provided with an internal annular recess 65 for telescoping engagement with an outwardly extending annular flange 66 formed on the bottom of the upper member 11. The upper end of the cap is provided with an opening 68 defining an inturned annular lip 64a on the cap. The upper member 11 is preferably provided with a pair of oppositely disposed flat faces 69 thereby adapting the member for engagement with a wrench or the like.

It should be apparent that generally horizontal swinging movement of the handle 57 will result in rotation of the cylinder 45 in the bore 14. Also, it will be apparent that downward movement of the handle 57 will result in upward movement of the cylinder 45 by reason of the lug 62 engaging the upper surface of the ring 63, which engagement is possible irrespective of the angular disposition of the cylinder 45 in the body member. Upward movement of the handle results in downward movement of the cylinder 45 in the central bore 14 by reason of engagement of the lug 62 with the underside of the lip 64a on the cap 64, which lug will always be in engagement with the underside of the lip 64a regardless of the angular disposition of the cylinder 45 in the body member. Downward movement of the cylinder is limited by engagement of the underside of the head member 58 with the flange 56b on the hollow plug.

The operation of the single lever mixing faucet of this invention will now be explained:

First, referring to FIGS. 3 and 5 which show the mixing faucet in the open position thereof, i.e., when the cylinder 45 is in its lowermost position in the bore 14, it will be apparent that hot and cold water being admitted to the side bores 35 and 36 will pass radially inwardly of the body through the ports 42 and 43 in the liner 13. In the drawings, the cylinder 45 is illustrated in an angular disposition in the body member in what is termed a neutral position, i.e., equal amounts of hot and cold water are admitted to the interior of the cylinder 45 through the slot 48, since the slot registers equally with the ports 42 and 43. Water entering the bore 46 of the cylinder 45 will pass upwardly through the same and radially outwardly through the openings 51 and passages 31 in the sleeve-like portion 18 of the upper member 11. The mixture of hot and cold water flows from the passages 31 into the annular cavity 30 and then through the opening 21 for discharge through the spout 22.

The temperature of the water being discharged from the spout 22 is varied by rotation of the cylinder 45 by means of the handle 57. As is apparent from FIG. 2, rotation of the cylinder 45 in a clockwise direction decreases the amount of registration of the port 43 with the slot 48 while the port 42 remains in full registration with the slot. This rotation of the cylinder will result in water of a higher temeprature being discharged from the spout 22 as a greater amount of hot water will be admitted through the port 42 than cold water through the port 43. It will be apparent that rotation of the cylinder 45 in the opposite direction, i.e., a counterclockwise direction as viewed in FIG. 2, will result in water of decreased temperature being discharged through the spout by virtue of the change in the respective amounts of registration of the ports 42 and 43 with the slot 48. It will be apparent that the temperatuer of the water being discharged may be uniformly varied by rotation of the cylinder 45 as described. Preferably, the cylinder is provided with suitable stop means engageable with the body for limiting rotation of the cylinder between the full hot and cold positions.

The rate of water being discharged from the mixing faucet is varied by reciprocating movement of the cylinder 45 in the bore 14. Upward movement of the cylinder 45 results in movement of the slot 48 out of registration with the ports 42 and 43. Manifestly, the amount of registration of the slot with the ports controls the rate of water being dispensed from the mixing faucet.

The single lever mixing faucet is completely closed by moving the handle 57 downwardly until the annular shoulder 45b on the cylinder abuts the lower end of the sleeve-like portion 18 of the upper member 11. This results in full upward movement of the cylinder 45, which likewise results in the outlet openings 51 being moved above O-rings 54 thereby sealing openings 51 for preventing escape of water from the bore 46 in the cylinder 45. It is primarily the action of O-rings 54 which results in shutting off the flow of water and not movement of the slot 48 out of registration with the ports 42 and 43, as a small quantity of water can pass between the ports 42 and 43 and the slot because of the minute clearance between the enlarged portion 45a of the cylinder and the interior of the liner 13. The action of O-rings 54 results in leak-proof closing of the mixing faucet.

As mentioned above, the conduit 40 is preferably connected with a dish spray attachment if the mixing faucet is used in association with a sink, such as a kitchen sink. With the mixing faucet in the open position thereof opening of the nozzle of the spray attachment results in actuation of the spout diverter (not shown) housed in the annular cavity 30. This actuation of the spout diverter results in diversion of water in the annular cavity from the opening 21 to the side bore 37, which side bore is normally sealed from the annular cavity by the spout diverter. Closing of the spray nozzle results in sealing of the bore 37 and flow through the opening 21 to the spout 22.

It will be noted that the single lever mixing faucet of this invention is balanced while in the closed and opened position thereof as well as any intermediate positions. This is brought about because hot and cold water under pressure entering the body of the mixing faucet is never allowed to act on the exterior of the cylinder 45 at the ends thereof. Accordingly, there is no tendency of the cylinder 45 to move axially by virtue of water pressure on the exterior thereof. Fluid on the inside of the cylinder 45, i.e., in the blind bore 46 closed by the plug 47, acts in equal and opposite directions on the cylinder. Accordingly, there is no tendency for the cylinder 45 to move axially by reason of water pressure on the interior thereof. There is no tendency of the cylinder 45 to rotate about the longitudinal axis thereof when subjected to fluid pressure because the incoming hot and cold water enters radially of the cylinder at one end thereof and passes radially outwardly of the cylinder at the other end thereof. It will be apparent that the cylinder 45 will remain in a balanced condition whether it is in its closed or open position as the above-mentioned conditions apply when the cylinder is in its upper or lower position or any position therebetween.

Thus it will be seen that by this invention a single lever mixing faucet of new and improved construction has been provided. The mixing faucet includes a body member of unique construction wherein hot and cold water inlets enter the body axially of the same at one end thereof thereby providing a faucet of compact design which lends itself for easy and attractive mounting on a sink or other similar type fixture. Of course, it will be realized that the mixing faucet of this invention may be used with fixtures other than kitchen sinks or bath tubs, as the mixing faucet of this invention has utility in any installation where it is desired to control the mixing of two separate liquids and control the rate of discharge of the resulting mixture.

While the invention has been shown in but one form it will be obvious to those skilled in the art that it is not to be so limited, but on the contrary it is susceptible of various changes and modifications without departing from the spirit and scope of the appended claims. As an example, it will be realized that it is within the scope of the invention to provide the body member without the through side bore therein.

I claim:

1. In a mixing faucet of the type characterized by a body having an axially extending central bore and an annular cavity communicating with the bore, a hollow closed end cylinder mounted for both reciprocation and rotation in said bore, which cylinder is provided with hot and cold water inlet means adjacent one end thereof and water outlet means adjacent the other end thereof, and means for reciprocating and rotating said cylinder; the provision in said body of three axially extending side bores, all of which side bores open laterally into said central bore, two of which side bores terminate in said body and the other of which side bores opens axially into said annular cavity, and a cylindrical liner in said central bore, which liner is provided with hot and cold water inlet ports for communication with the side bores terminating in said body.

2. In a mixing faucet of the type characterized by a body having an axially extending central bore and an annular cavity communicating with the bore, a hollow closed end cylinder mounted for both reciprocation and rotation in said bore, which cylinder is provided with hot and cold water inlet means adjacent one end thereof and water outlet means adjacent the other end thereof, and means for reciprocating and rotating said cylinder; the provision in said body of three equally spaced axially extending side bores, all of which side bores open laterally along substantially the entire lengths thereof into said central bore, two of which side bores terminate in said body and the other of which side bores opens axially into said annular cavity, and a cylindrical liner in said central bore, which liner is provided with hot and cold water inlet ports for communication with the side bores terminating in said body.

3. In a mixing faucet for controlling both the rate and temperature of water dispensed therefrom, a body having an axially extending central bore and outlet passage means in one end thereof, which means communicates with said central bore, said body having three axially extending side bores in the other end thereof, all of which side bores open laterally into said central bore, two of which side bores terminate in said body and the other of which side bores is adapted for communication with said outlet passage means, a cylindrical liner in said central bore, which liner is provided with hot and cold water inlet means for communication with the side bores terminating in said body, a hollow closed end cylinder mounted for both reciprocation and rotation in said central bore and in said liner, which cylinder is provided with radially extending water outlet means adjacent one end thereof and with hot and cold water inlet means adjacent the other end thereof for simultaneous communication with said outlet passage means and said inlet ports, respectively.

4. In a mixing faucet for controlling both the rate and temperature of water dispensed therefrom, a body having an axially extending central bore and an annular cavity encircling the central bore in spaced relation thereto, said body having a plurality of radially extending outlet passages communicating said central bore with said annular cavity, said body having three axially extending side bores in one end thereof, all of which side bores open laterally into said central bore, two of which side bores terminate in said body and the other of which side bores opens axially into said annular cavity, a cylindrical liner in said central bore, which liner is provided with hot and cold water inlet means for communication with the side bores terminating in said body, a hollow closed end cylinder mounted for both reciprocation and rotation in said central bore and in said liner, which cylinder is provided with radially extending water outlet means adjacent one end thereof and with hot and cold water inlet means adjacent the other end thereof for simultaneous communication with said outlet passages and said inlet ports, respectively.

5. In a mixing faucet for controlling both the rate and temperature of water dispensed therefrom, a body having an axially extending central bore and an annular cavity encircling the central bore in spaced relation thereto, said body having a plurality of radially extending outlet passages communicating said central bore with said annular cavity, said body having three axially extending side bores in one end thereof, all of which side bores open laterally along substantially the entire lengths thereof into said central bore, two of which side bores terminate in said body and the other of which side bores opens axially into said annular cavity, a cylindrical liner in said central bore in said one end of the body, which liner is provided with hot and cold water inlet ports for communication with said side bores terminating in said body, a hollow closed end cylinder mounted for both reciprocation and rotation in said central bore and in said liner which cylinder is provided with radially extending water outlet means adjacent one end thereof and with hot and cold water inlet means adjacent the other end thereof for simultaneous communication with said outlet passages and said inlet ports, respectively.

6. In a mixing faucet for controlling both the rate and temperature of water dispensed therefrom, a body having an axially extending central bore and an annular cavity encircling the bore in spaced relation thereto said body having a plurality of radially extending outlet passages communicating said central bore with said annular cavity, annular sealing means in said central bore adjacent said outlet passages, said body having three equally spaced axially extending side bores in one end thereof, all of which side bores open laterally into said central bore, two of which side bores terminate in said body and the other of which side bores opens axially into said annular cavity, a cylindrical liner in said central bore in said one end of the body, which liner is provided with hot and cold water inlet ports for communication with the side bores terminating in said body, a hollow closed end cylinder mounted for both reciprocation and rotation in said central bore, which cylinder is provided with radially extending water outlet openings adjacent one end thereof and with hot and cold water inlet means adjacent the other end thereof for simultaneous communication with said outlet passages and with said inlet ports, respectively, which hot and cold water inlet means includes a semi-circular slot transversely disposed in said cylinder, said sealing means being adapted to seal said water outlet openings when said cylinder is moved axially, thereby preventing escape of water from the water outlet openings.

7. In a mixing faucet of the type characterized by a generally hollow body receiving a hollow closed end cylinder for both reciprocation and rotation within the body, which cylinder is provided with hot and cold water inlet means adjacent one end thereof and water outlet means adjacent the other end thereof, and means for reciprocating and rotating the cylinder, the improvement which comprises, said body including a base member having an axially extending central bore opening at one end of the base member into the interior of said body and terminating short of the other end of the base member, said base member also including two axially extending side bores opening at said other end of the base member and terminating short of said one end of the base member, which side bores open laterally into said central bore and which side bores are adapted for communication with hot and cold water conduits, and a cylindrical liner in said central bore separating the latter from the side bores, which liner is provided with hot and cold water inlet ports communicating with said side bores.

8. In a mixing faucet of the type characterized by a generally hollow body receiving a hollow closed end cylinder for both reciprocation and rotation within the body, which cylinder is provided with hot and cold water inlet means adjacent one end thereof and water outlet means adjacent the other end thereof, and means for reciprocating and rotating the cylinder, the improvement which comprises, said body including a base member having an axially extending central bore opening at one end of the base member into the interior of said body and terminating short of the other end of the base member, said base member also including two axially extending side bores opening at said other end of the base member and terminating short of said one end of the base member, which side bores open laterally into said central bore along a portion of their lengths, the remaining portions of said side bores thereby being adapted for communication with hot and cold water conduits, and a cylindrical liner in said central bore separating the latter from the side bores, which liner is provided with hot and cold water inlet ports communicating with said side bores.

9. In a mixing faucet of the type characterized by a generally hollow body receiving a hollow closed end cylinder for both reciprocation and rotation within the body, which cylinder is provided with hot and cold water inlet means adjacent one end thereof and water outlet means adjacent the other end thereof, and means for reciprocating and rotating the cylinder, the improvement which comprises, said body including a base member having a first axially extending central bore opening at one end of the base member into the interior of said body and terminating short of the other end of the base member, said base member including a second central bore coaxial and in communication with said first bore and opening at said other end of the base member, which second bore is smaller in diameter than said first bore, said base member also including two axially extending side bores opening at said other end of the base member and terminating short of said one end of the base member, which side bores open laterally into said central bore along a portion of their lengths, the remaining portions of said side bores being circular in cross section and thereby adapted for communication with hot and cold water conduits, and a cylinder liner in said central bore having a length at least as great as the length of the first mentioned portion of the side bores thereby separating said first bore from the side bores, which liner is provided with hot and cold water inlet ports communicating with said side bores.

10. In a mixing faucet for controlling both the rate and temperature of water dispensed therefrom, a body including a first member having an axially extending central bore and a base member having an axially extending central bore opening at one end of the base member into the interior of said body and terminating short of the other end of the base member, said body including outlet passage means communicating with the central bore in said first member, said base member also including two axially extending side bores opening at said other end of the base member and terminating short of said one end of the base member, which side bores open laterally into said central bore of the base member and are adapted for communication with hot and cold water conduits, a cylindrical liner in the base member central bore separating the latter from the side bores, which liner is provided with hot and cold water inlet ports communicating with said side bores, a hollow closed end cylinder having one of its ends slidably received in the central bore in said first member and having its other end slidably received in said liner thereby to mount the cylinder for both reciprocation and rotation within said body, said cylinder being provided with water outlet means at one end thereof and with hot and cold water inlet means adjacent the other end thereof for simultaneous communication with said outlet passage means and said inlet ports respectively.

11. The mixing faucet according to claim 10 wherein annular sealing means is provided in the central bore of the first member adjacent said outlet passage means thereby to seal said water outlet means upon axial movement of the cylinder relative to the body.

12. The mixing faucet according to claim 11 wherein said sealing means includes at least one O-ring.

13. The mixing faucet according to claim 11 wherein said sealing means includes a packing ring and at least one O-ring disposed between the packing ring and the outlet passage means.

14. The mixing faucet according to claim 13 wherein said packing ring forms a snug frictional fit with said cylinder for holding the latter in a desired angular and axial position in the body.

15. The mixing faucet according to claim 10 wherein said outlet passage means includes an annular cavity encircling the first member central bore and communicating with the latter through a plurality of radially extending passages.

16. In a mixing faucet for controlling both the rate and temperature of water dispensed therefrom, a body including a first member having an axially extending central bore and a base member having an axially extending central bore opening at one end of the base member into the interior of said body and terminating short of the other end of the base member, said body including outlet passage means communicating with the central bore in said first member, said base member also including two axially extending side bores opening at said other end of the base member and terminating short of said one end of the base member, which side bores open laterally into said central bore along a portion of their lengths, the remaining portions of said side bores being circular in cross section and thereby adapted for communication with hot and cold water conduits, a cylinder liner in the base member central bore separating the latter from the side bores, which liner is provided with hot and cold water inlet ports communicating with said side bores, a hollow closed end cylinder having one of its ends slidably received in the central bore in said first member and having its other end slidably received in said liner thereby to mount the cylinder for both reciprocation and rotation within said body, said cylinder being provided with water outlet means at one end thereof and with hot and cold water inlet means adjacent the other end thereof for simultaneous communication with said outlet passage means and said inlet ports respectively.

References Cited by the Examiner

UNITED STATES PATENTS

| 613,041 | 10/98 | Kamerer | 251—325 X |
| 865,535 | 9/07 | Saxe | 251—325 X |
| 937,096 | 10/09 | Schmid | 251—325 |
| 2,924,243 | 2/60 | Cordova | 137—625.17 |
| 2,975,806 | 3/61 | Moen | 137—625.17 |

FOREIGN PATENTS

| 627,051 | 9/61 | Canada. |
| 927,003 | 5/63 | Great Britain. |

M. CARY NELSON, *Primary Examiner.*

UNITED STATES PATENT OFFICE
CERTIFICATE OF CORRECTION

Patent No. 3,202,181                                               August 24, 1965

Clarence W. West

It is hereby certified that error appears in the above numbered patent requiring correction and that the said Letters Patent should read as corrected below.

Column 1, line 51, for "drawing" read -- drawings --; column 2, line 67, for "7" read -- 17 --; column 7, line 68, after "bore" insert -- and in said liner --; column 8, line 65, for "cylinder liner in said centrol" read -- cylindrical liner in said central --.

Signed and sealed this 3rd day of May 1966.

(SEAL)
Attest:

ERNEST W. SWIDER                                         EDWARD J. BRENNER
Attesting Officer                                              Commissioner of Patents